United States Patent
Jang et al.

(10) Patent No.: US 11,171,371 B2
(45) Date of Patent: Nov. 9, 2021

(54) CYLINDRICAL SECONDARY BATTERY INCLUDING STRUCTURE CONFIGURED TO BLOCK LASER BEAM FOR WELDING AND BATTERY PACK INCLUDING THE SAME

(71) Applicant: LG CHEM, LTD., Seoul (KR)

(72) Inventors: Jae Young Jang, Daejeon (KR); Young Su Son, Daejeon (KR); Young Kyu Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 129 days.

(21) Appl. No.: 16/736,355

(22) Filed: Jan. 7, 2020

(65) Prior Publication Data

US 2020/0144686 A1 May 7, 2020

Related U.S. Application Data

(63) Continuation of application No. PCT/KR2019/001786, filed on Feb. 14, 2019.

(30) Foreign Application Priority Data

Mar. 2, 2018 (KR) .......................... 10-2018-0025074

(51) Int. Cl.
*H01M 10/653* (2014.01)
*H01M 10/643* (2014.01)
(Continued)

(52) U.S. Cl.
CPC .......... *H01M 10/653* (2015.04); *B23K 26/21* (2015.10); *H01M 10/0422* (2013.01);
(Continued)

(58) Field of Classification Search
CPC .. H01M 10/653; H01M 50/20; H01M 50/116; H01M 50/124; H01M 50/147;
(Continued)

(56) References Cited

U.S. PATENT DOCUMENTS 6,635,382 B2    10/2003  Moriwaki et al.
2002/0197529 A1  12/2002  Moriwaki et al.
(Continued)

FOREIGN PATENT DOCUMENTS

EP    2 416 400 A1    2/2012
JP    10-208777 A     8/1998
(Continued)

OTHER PUBLICATIONS

International Search Report issued in PCT/KR2019/001786 (PCT/ISA/210), dated May 17, 2019.
(Continued)

*Primary Examiner* — Stewart A Fraser
(74) *Attorney, Agent, or Firm* — Birch, Stewart, Kolasch & Birch, LLP (57) ABSTRACT

A cylindrical secondary battery including a cylindrical battery case configured to receive an electrode assembly and an electrolytic solution, a cap assembly located on the open upper end of the cylindrical battery case, and a jelly-roll type electrode assembly configured to have a structure in which a positive electrode sheet and a negative electrode sheet are wound in the state in which a separator is interposed therebetween, wherein a protective layer, made of a material that exhibits high thermal conductivity, is formed on at least a portion of the inner surface of the cylindrical battery case, including a crimping part is provided.

16 Claims, 7 Drawing Sheets

(51) Int. Cl.
  *H01M 50/20*     (2021.01)
  *H01M 50/116*    (2021.01)
  *H01M 50/124*    (2021.01)
  *H01M 50/147*    (2021.01)
  *H01M 50/531*    (2021.01)
  *B23K 26/21*     (2014.01)
  *H01M 10/04*     (2006.01)

(52) U.S. Cl.
  CPC ..... *H01M 10/0431* (2013.01); *H01M 10/643* (2015.04); *H01M 50/116* (2021.01); *H01M 50/124* (2021.01); *H01M 50/147* (2021.01); *H01M 50/20* (2021.01); *H01M 50/531* (2021.01)

(58) Field of Classification Search
  CPC ............ H01M 50/531; H01M 10/643; H01M 10/0422; H01M 10/0431; H01M 50/502; H01M 50/1243; H01M 50/10; B23K 26/21
  See application file for complete search history.

(56) References Cited

U.S. PATENT DOCUMENTS

| | | | |
|---|---|---|---|
| 2010/0136394 A1* | 6/2010 | Miyahisa | H01M 10/0431 429/94 |
| 2012/0009464 A1 | 1/2012 | Nakazawa et al. | |
| 2015/0140417 A1 | 5/2015 | Matsumoto et al. | |
| 2015/0236334 A1* | 8/2015 | Lee | H01M 50/152 429/82 |

FOREIGN PATENT DOCUMENTS

| | | |
|---|---|---|
| JP | 2001-93506 A | 4/2001 |
| JP | 2003-168405 A | 6/2003 |
| KR | 10-2002-0018998 A | 3/2002 |
| KR | 10-2005-0110501 A | 11/2005 |
| KR | 10-2006-0111846 A | 10/2006 |
| KR | 10-2007-0018817 A | 2/2007 |
| KR | 10-2008-0009354 A | 1/2008 |
| KR | 10-2013-0110246 A | 10/2013 |
| KR | 10-2013-0111055 A | 10/2013 |
| KR | 10-2015-0058042 A | 5/2015 |
| KR | 10-2016-0049713 A | 5/2016 |
| KR | 10-2018-0013345 A | 2/2018 |

OTHER PUBLICATIONS

Extended European Search Report for European Application No. 19761069.4, dated Nov. 17, 2020.

* cited by examiner

Wavelength of light

FIG.7

CYLINDRICAL SECONDARY BATTERY INCLUDING STRUCTURE CONFIGURED TO BLOCK LASER BEAM FOR WELDING AND BATTERY PACK INCLUDING THE SAME

This application is a by-pass continuation of PCT/KR2019/001786, filed Feb. 14, 2019, which claims the benefit of Korean Patent Application No. 2018-0025074 filed on Mar. 2, 2018 with the Korean Intellectual Property Office, the disclosure of which are herein incorporated by reference in their entirety.

TECHNICAL FIELD

The present invention relates to a cylindrical secondary battery including a structure configured to block a laser beam for welding, and more particularly to a cylindrical secondary battery configured to have a structure in which a protective layer, made of a material that exhibits high thermal conductivity, is formed on at least a portion of the inner surface of a cylindrical battery case configured to receive an electrode assembly and an electrolytic solution, including a crimping part.

BACKGROUND ART

Secondary batteries, which are capable of being charged and discharged, have attracted considerable attention as power sources for an electric vehicle (EV), a hybrid electric vehicle (HEV), and a plug-in hybrid electric vehicle (Plug-In HEV), which have been proposed to solve problems, such as air pollution, caused by existing gasoline and diesel vehicles using fossil fuels.

In addition, the secondary batteries have also come to be used in a power tool that requires high output, an electric bicycle (E-bike), an electric scooter (E-scooter), an electric golf cart, or an energy storage system.

The secondary batteries are classified into a cylindrical secondary battery having an electrode assembly mounted in a cylindrical metal can, a prismatic secondary battery having an electrode assembly mounted in a prismatic metal can, and a pouch-shaped secondary battery having an electrode assembly mounted in a pouch-shaped case made of an aluminum laminate sheet. Among these batteries, the cylindrical secondary battery has advantages in that the capacity of the cylindrical secondary battery is large and in that the cylindrical secondary battery is structurally stable.

The electrode assembly, which is mounted in a battery case, is a power-generating element configured to have a structure in which a positive electrode, a separator, and a negative electrode are stacked and configured so as to be capable of being charged and discharged. The electrode assembly is classified as a jelly-roll type electrode assembly, which is configured to have a structure in which a long sheet type positive electrode and a long sheet type negative electrode, to which active materials are applied, are wound in the state in which a separator is interposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are interposed respectively between the positive electrodes and the negative electrodes. The jelly-roll type electrode assembly has advantages in that the jelly-roll type electrode assembly is easy to manufacture and in that the jelly-roll type electrode assembly has high energy density per unit weight.

In general, in order to manufacture a high-capacity and high-voltage battery, a plurality of battery cells is connected to each other in series and/or in parallel to manufacture a battery module or a battery pack. A method of connecting a metal plate, etc. to electrode terminals of the battery cells may be used as a means for connection of battery cells.

For a cylindrical battery cell, a plurality of cylindrical battery cells may be connected to each other using a connection method, such as wire bonding, in the state in which the cylindrical battery cells are erected such that the longitudinal direction of each of the cylindrical battery cells is perpendicular to the ground.

Alternatively, a metal plate may be attached to a plurality of battery cells by welding in order to achieve electrical connection between the battery cells.

In the case in which laser welding is used as a method of welding the metal plate to the battery cells, however, the energy of a laser may be concentrated on a welded part of each of the battery cells, whereby an overheating phenomenon may occur, or the battery case may be penetrated due to overwelding, whereby there is a risk of leakage of an electrolytic solution from the battery case.

In connection therewith, Patent Document 1 discloses a battery configured to have a structure in which the edge of a sheet type electrode, used to manufacture a wound type electrode assembly, is bent almost to a right angle and is coupled to a current collection plate, located at the upper part of the wound type electrode assembly, and a corner part at which the current collection plate and the sheet type electrode intersect each other is filled with a material configured to block a laser beam such that welding heat is not transmitted when laser welding is performed outside the current collection plate.

However, Patent Document 1 discloses a structure configured to block welding heat generated at the time of coupling between the electrode and the current collection plate in a battery cell, but does not disclose a structure configured to block welding heat generated when a metal plate is attached to the outer surface of the battery cell.

Patent Document 2 discloses a sealed type battery including an insulator disposed between a battery case and a terminal, wherein the battery case includes a cover plate, the outer circumferential edge of which is welded to an opening part of a sheathing can in the state of which the cover plate covers the opening part, and a heat transfer inhibition part is installed at the cover plate between a welded part, between the cover plate and the opening part of the sheathing can, and the insulator.

The heat transfer inhibition part disclosed in Patent Document 2 is configured to have a structure in which irregularities are formed on the outer surface of the cover plate, whereby it is possible to prevent welding heat from being transferred to an electrode that protrudes outwards; however, it is difficult to prevent the welding heat from being transferred to the inside of the battery case.

Patent Document 3 discloses a battery pack configured to have a structure in which two or more cylindrical battery cells are connected to each other in parallel by a connection member, wherein the battery cells are coupled to the connection member by laser welding, and a plated layer configured to prevent corrosion is formed on the connection member.

However, Patent Document 3 does not disclose a structure that is capable of preventing damage to an electrode assembly located in a battery case at the time of laser welding.

Therefore, there is a high necessity for technology that is capable of preventing damage to a battery case and an electrode assembly due to welding heat when laser welding is used to couple cylindrical secondary batteries to each other.

PRIOR ART DOCUMENT (Patent Document 1) Japanese Patent Application Publication No. 2001-093506
(Patent Document 2) Korean Patent Application Publication No. 2015-0058042
(Patent Document 3) Korean Patent Application Publication No. 2013-0111055

DISCLOSURE

Technical Problem

The present invention has been made in view of the above problems, and it is an object of the present invention to provide a cylindrical secondary battery having improved safety against welding heat at the time of welding for coupling between battery cells.

Technical Solution

In accordance with an aspect of the present invention, the above and other objects can be accomplished by the provision of a cylindrical secondary battery including a jelly-roll type electrode assembly, a cylindrical battery case configured to receive the jelly-roll type electrode assembly and an electrolytic solution, the cylindrical battery case having a crimping part at an open upper end thereof, a cap assembly located on the open upper end of the cylindrical battery case, and a protective layer, made of a material that exhibits high thermal conductivity, is formed on at least a portion of an inner surface of the cylindrical battery case, including the crimping part.

The protective layer may be made of copper or a copper alloy.

A negative electrode tab of the jelly-roll type electrode assembly may be coupled to the protective layer formed on the inner surface of the battery case, and the protective layer may be formed over the entire inner surface of the cylindrical battery case.

The negative electrode tab may be made of a copper or nickel material.

The negative electrode tab of the jelly-roll type electrode assembly may be coupled to the protective layer by ultrasonic welding, resistance welding, or laser welding.

The jelly-roll type electrode assembly may include a negative electrode tab made of a nickel material, and a nickel-plated layer may be formed on the surface of the protective layer, to which the negative electrode tab is coupled.

The protective layer may be configured to have a structure in which irregularities are formed on the surface of the protective layer opposite the surface of the protective layer that faces the inner surface of the cylindrical battery case.

The protective layer may be additionally formed on at least a portion of the outer surface of the cylindrical battery case.

The protective layer may have a reflectance of 62% to 90% when the wavelength of a laser is 0.6 μm to 1.1 μm.

The cylindrical secondary battery may include a metal plate coupled to the crimping part of the cylindrical battery case.

The metal plate may be ring shaped and have a through bore.

The metal plate may have a protrusion extending from a lower surface of the metal plate facing the crimping part.

In accordance with another aspect of the present invention, there is provided a battery pack including cylindrical secondary batteries, each of which is configured to have the above structure, wherein the cylindrical secondary batteries are connected to each other in parallel by a metal plate.

The metal plate may be coupled to the crimping part of each of the cylindrical secondary batteries or to the lower surface of the cylindrical battery case of each of the cylindrical secondary batteries by laser welding.

The metal plate may be configured to have a structure in which a protrusion is formed on the part of the metal plate that is coupled to the crimping part of the cylindrical battery case.

The part of the metal plate that is coupled to the lower surface of the cylindrical battery case may be configured to have a flat structure.

BEST MODE

In order to solve the above problems, a cylindrical secondary battery according to the present invention may include a cylindrical battery case configured to receive an electrode assembly and an electrolytic solution, a cap assembly located on the open upper end of the cylindrical battery case, and a jelly-roll type electrode assembly configured to have a structure in which a positive electrode sheet and a negative electrode sheet are wound in the state in which a separator is interposed therebetween, wherein a protective layer, made of a material that exhibits high thermal conductivity, may be formed on at least a portion of the inner surface of the cylindrical battery case, including a crimping part.

To meet the necessity for a high-capacity and high-voltage battery, a plurality of battery cells may be coupled to each other in order to increase the capacity of the battery, or a battery having a high voltage may be manufactured. In order to couple the battery cells to each other, as described above, a bus bar or a metal plate may be used.

That is, series connection or parallel connection between battery cells may be achieved by coupling the bus bar or the metal plate to electrodes of the battery cells in the state in which the battery cells are arranged.

In the cylindrical secondary battery according to the present invention, the crimping part is formed in the state in which the cap assembly is located at the upper end of the battery case in order to fix the cap assembly. The crimping part is a portion of the battery case, and therefore may serve as a negative electrode terminal.

Therefore, in the case in which the bus bar or the metal plate is coupled to the crimping part, the bus bar or the metal plate may be coupled to crimping parts of a plurality of cylindrical secondary batteries in order to manufacture a first battery module configured to have a structure in which the cylindrical secondary batteries are connected to each other in parallel.

In addition, a top cap of the cylindrical secondary battery serves as a positive electrode terminal. Consequently, the bus bar or the metal plate may be coupled to top caps of a plurality of cylindrical secondary batteries in order to manufacture a second battery module configured to have a structure in which the cylindrical secondary batteries are connected to each other in parallel, and the first battery module and the second battery module may be electrically connected to each other in order to manufacture a high-voltage and high-output battery pack.

The battery case may be made of a metal material, such as aluminum, an aluminum alloy, or stainless steel having improved strength. In the case in which the bus bar or the metal plate is made of metal, weldability is secured, whereby it is possible to prevent the bus bar or the metal plate from being separated from the battery cells.

Also, in the case in which a protective layer made of a material that exhibits high thermal conductivity is formed in the inner surface of the battery case, it is possible to rapidly move welding heat, which is concentrated on a part being welded, to other parts. Consequently, it is possible to prevent the welding heat from being concentrated on a specific region, such as the crimping part, and therefore it is possible to prevent the battery case from being penetrated as the result of concentration of the welding heat due to overwelding and thus to prevent the leakage of an electrolytic solution.

As described above, the cylindrical secondary battery according to the present invention is configured to have a two-layered structure including a battery case and a protective layer, whereby it is possible to improve heat dissipation efficiency while preventing the deterioration of weldability.

It is preferable for the protective layer to exhibit high thermal conductivity. For example, the protective layer may be made of gold, silver, copper, or an alloy thereof.

A negative electrode tab of the jelly-roll type electrode assembly may be coupled to the protective layer formed on the inner surface of the battery case, and the protective layer may be formed over the entire inner surface of the battery case.

For example, the negative electrode tab may be made of a copper or nickel material. In the case in which the negative electrode tab is made of a copper material and the protective layer is made of a copper material, it is possible to secure the weldability of the negative electrode tab to the battery case, on which the protective layer is formed.

Alternatively, the jelly-roll type electrode assembly may include a negative electrode tab made of a nickel material. In order to prevent the deterioration of weldability as the result of the protective layer being formed on the inner surface of the battery case, a nickel-plated layer may be formed on the surface of the protective layer to which the negative electrode tab is coupled.

Ultrasonic welding, resistance welding, or laser welding may be used to couple the metal plate to the battery case. Preferably, laser welding is used, since it is possible to perform precise welding and to prevent a change in the nature of a base material.

Specifically, in the case in which laser welding is performed in order to couple the metal plate to the crimping part of the cylindrical secondary battery, welding heat may be concentrated on a welded part of the crimping part, whereby the battery case may be damaged. Irregularities may be formed on the surface of the protective layer opposite the surface of the protective layer that faces the inner surface of the battery case in order to refract or scatter the laser beam, whereby it is possible to prevent energy from being concentrated on a specific region.

In a concrete example, in consideration of the fact that the protective layer exhibits high thermal conductivity, the protective layer may be formed so as to be thick in order to disperse the welding heat applied to the cylindrical secondary battery.

Alternatively, the protective layer may be formed on the outer surface of the battery case as well as the inner surface thereof. The protective layer may be additionally formed on at least a portion of the outer surface of the cylindrical battery case.

The protective layer may have a reflectance of 62% to 90% when the wavelength of a laser is 0.6 μm to 1.1 μm.

Figure 5:
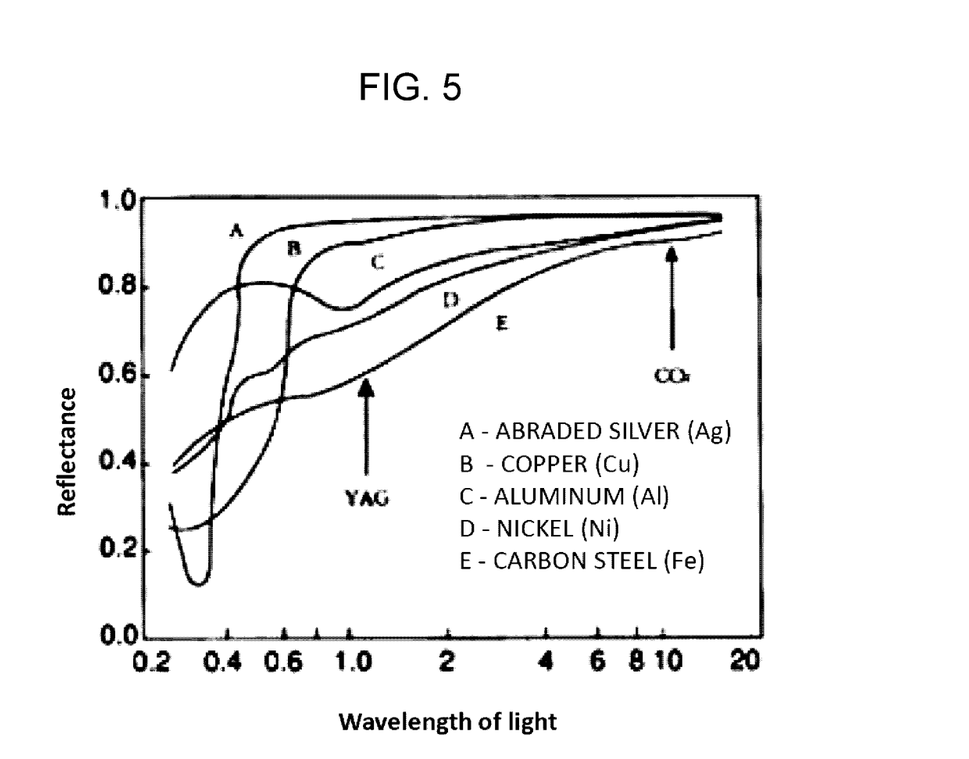
FIG. 5 is a graph showing the reflectance of metals.

In connection therewith, FIG. 5 shows the reflectance of metals depending on the wavelength of light. Referring to FIG. 5, in the case in which a YAG laser is used, the reflectance of carbon steel (Fe) is about 58%, and the reflectance of nickel (Ni) is about 58%. In the case in which the YAG laser is used, the reflectance of copper (Cu) is about 90%.

In the case in which a copper material is used for the protective layer, therefore, it is possible to reflect about 90% of a laser beam generated at the time of laser welding, compared to the case in which carbon steel or nickel is used for the protective layer, whereby it is possible to prevent welding heat from being concentrated on the welded part.

The present invention also provides a battery pack including cylindrical secondary batteries, each of which is configured to have the above structure, wherein the cylindrical secondary batteries are connected to each other in parallel by a metal plate.

The metal plate may be coupled to the crimping part of each of the cylindrical secondary batteries or to the lower surface of the battery case of each of the cylindrical secondary batteries by laser welding.

The metal plate, which is coupled to the crimping part, may be configured to have a plate-shaped structure, may be configured to have a structure in which tubes, each having a shape and size corresponding to the shape and size of the crimping part of each of the cylindrical secondary batteries, are successively arranged, or may be configured to have a structure in which a protrusion is formed on the part of the metal plate that is coupled to the crimping part.

In consideration of the fact that the lower surface of the battery case is a flat surface, the part of the metal plate that is coupled to the lower surface of the cylindrical battery case may be configured to have a flat structure.

In addition, the cylindrical secondary battery according to the present invention may be used as a power source for a small-sized device. Furthermore, the cylindrical secondary battery according to the present invention is preferably used as a unit battery of a middle- or large-sized battery module that is used as a power source of a middle- or large-sized device.

Specific examples of the device may include a mobile electronic device, a wearable electronic device, a power tool driven by a battery-powered motor, an electric automobile, such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and an energy storage system. However, the present invention is not limited thereto.

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the another part, but also, the one part may be indirectly connected to the another part via a further part. In addition, that a certain element is included does not mean that other elements are excluded, but means that such elements may be further included unless mentioned otherwise.

Embodiments of the present invention will be described in detail with reference to the accompanying drawings.

Figure 1:
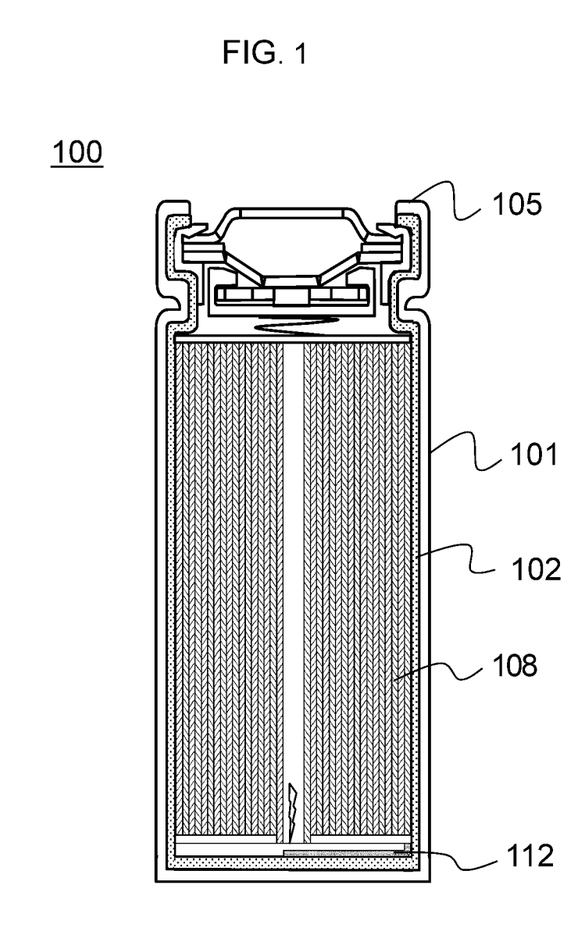
FIG. 1 is a vertical sectional view showing a cylindrical secondary battery having a protective layer formed on the inner surface of a battery case.

FIG. 1 is a vertical sectional view showing a cylindrical secondary battery having a protective layer formed on the inner surface of a battery case.

Referring to FIG. 1, a cylindrical secondary battery 100 is configured such that a protective layer 102 is formed in a battery case 101 and the protective layer 102 is also formed on the inner surface of a crimping part 105 of the battery case. The cylindrical secondary battery 100 includes a jelly-roll type electrode assembly 108 configured to have a structure in which a positive electrode sheet and a negative electrode sheet are wound in a state in which a separator is interposed therebetween. The electrode assembly 108 may include a negative electrode tab 112 coupled to the protective layer 102.

Consequently, the battery case 101 may be manufactured using a steel sheet, which is made of a metal material, on one surface of which the protective layer 102 is formed.

Figure 2:
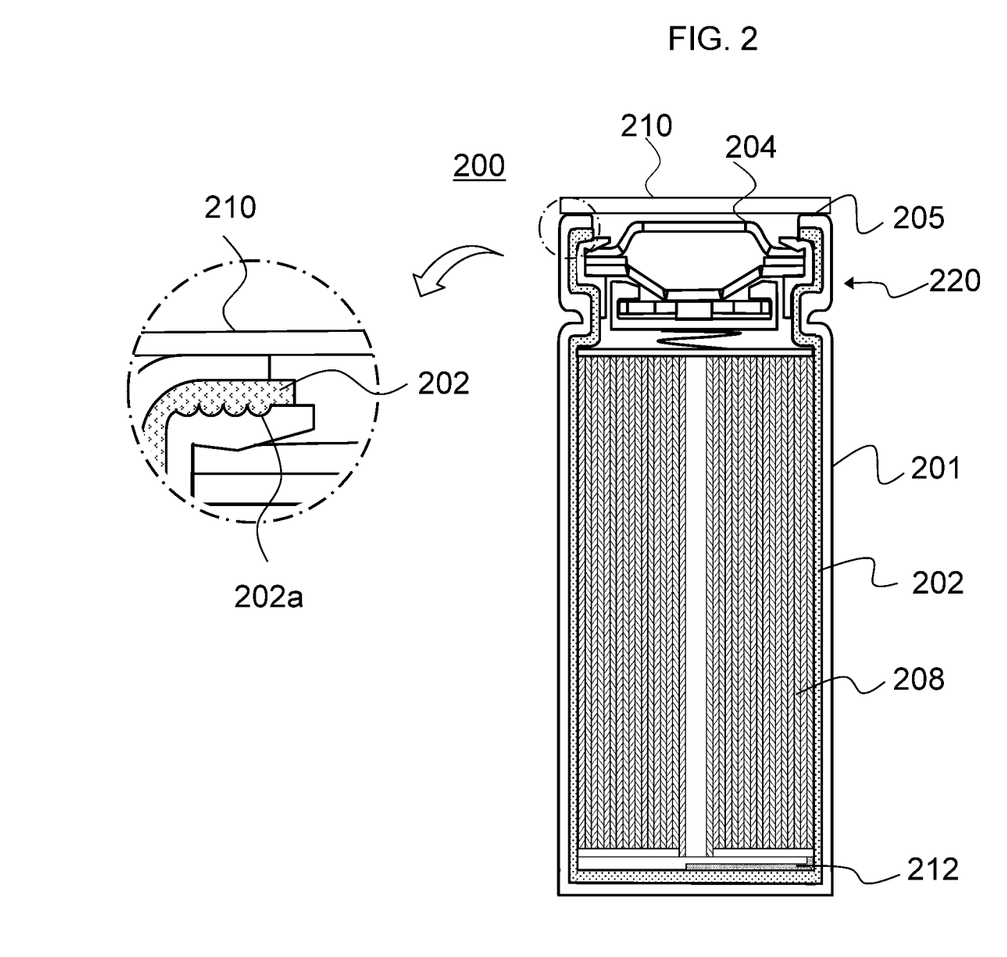
FIG. 2 is a vertical sectional view showing the structure in which a metal plate is coupled to the cylindrical secondary battery of FIG. 1.
Figure 3:
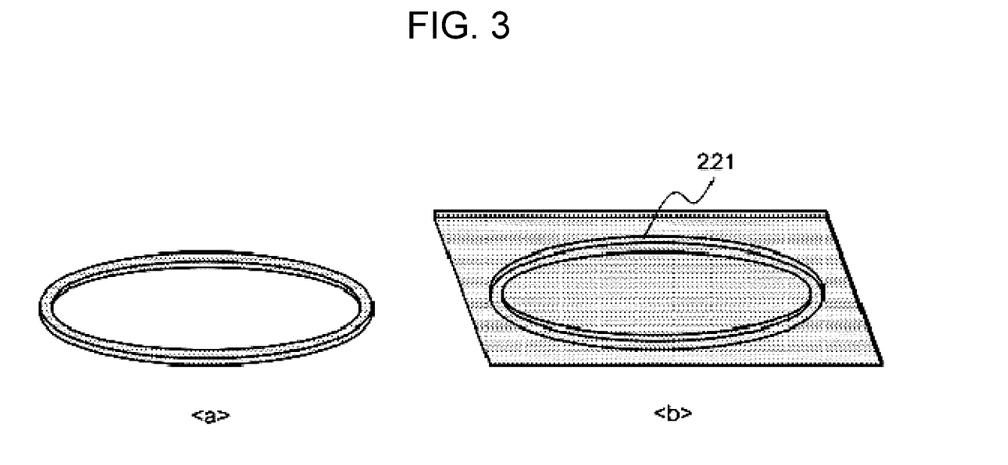
FIG. 3 is a perspective view showing a metal plate.

FIG. 2 is a vertical sectional view showing the structure in which a metal plate is coupled to a similar cylindrical secondary battery shown in FIG. 1, and FIG. 3 is a perspective view schematically showing a metal plate.

Referring to FIGS. 2 and 3, a metal plate 210 is coupled to the upper end of a cylindrical secondary battery 200. Specifically, the metal plate 210 is coupled to the upper end 220 of a crimping part 205 of the cylindrical secondary battery. The cylindrical secondary battery 200 includes a battery case 201. The cylindrical secondary battery 200 includes a jelly-roll type electrode assembly 208 configured to have a structure in which a positive electrode sheet and a negative electrode sheet are wound in a state in which a separator is interposed therebetween. The electrode assembly 208 may include a negative electrode tab 212 coupled to the protective layer 202.

The protective layer 202 may be configured to have a structure in which irregularities 202a are formed on a surface of the protective layer 202 opposite a surface of the protective layer that faces the inner surface of the cylindrical battery case 201.

The metal plate 210 is shown as being spaced apart from the upper end of a top cap 204 in FIG. 2; however, this is shown for the convenience of understanding. In the case in which the portion of the metal plate corresponding to the upper end of the top cap is bored (a) or concave (b), like the metal plate shown in FIG. 3, the metal plate may be coupled to the crimping part, which serves as a negative electrode terminal, without contacting the top cap, which is a positive electrode terminal.

In the case in which laser welding is performed in order to couple the crimping part and the metal plate to each other, as described above, the upper end 220 of the crimping part 205 may be overheated by the energy of a laser beam. However, in the case in which the protective layer 202 is formed, as in the present invention, it is possible to prevent the concentration of energy.

In addition, unlike what is shown in FIG. 2, the metal plate may of course not be coupled to the crimping part of the battery case, but may be coupled to the lower surface of the battery case.

Specifically, referring to FIG. 3, the metal plate (a) is formed in the shape of a tube, wherein the diameter of the outer circumference of the metal plate may have a size corresponding to the diameter of the horizontal section of the cylindrical secondary battery of FIG. 2, and the thickness of the metal plate may have a size corresponding to the width of the upper end of the crimping part 205. The metal plate (b) is formed so as to have a structure in which a protrusion 221 is formed on the lower surface of a flat surface of the metal plate, wherein it is possible to prevent contact between the metal plate and the top cap due to a concave part formed in the center of the metal plate.

FIG. 3 merely shows a concrete illustration of the metal plate that is capable of being used in the present invention. The structure of the metal plate is not particularly restricted, as long as the metal plate can be coupled to the battery case by laser welding for electrical connection of a battery cell and has a structure that is capable of preventing the occurrence of a short circuit.

Figure 4:
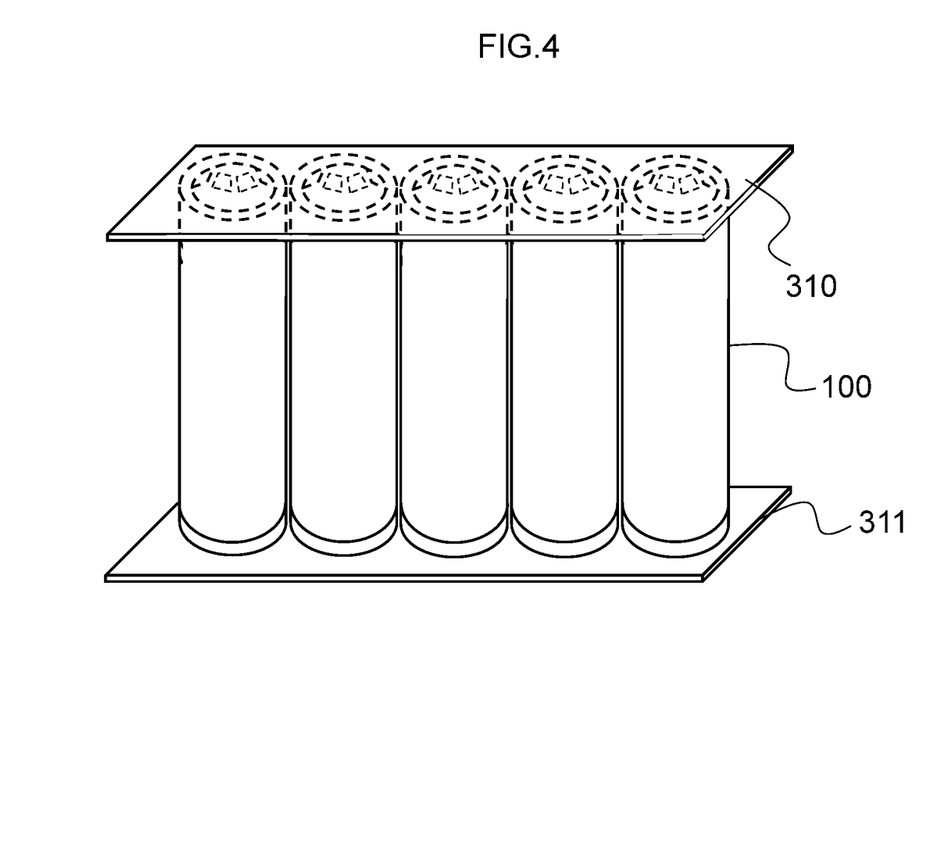
FIG. 4 is a perspective view showing the state in which a plurality of cylindrical secondary batteries, one of which is shown in FIG. 1, is coupled to each other by a metal plate.

FIG. 4 is a perspective view schematically showing the state in which cylindrical secondary batteries are coupled to each other by one or more metal plates.

Referring to FIG. 4, a metal plate 310 is coupled to the upper ends of a plurality of cylindrical secondary batteries 100. The metal plate 310 is coupled to crimping parts of the cylindrical secondary batteries 100 such that the cylindrical secondary batteries are connected to each other in parallel. A second metal plate 311 is coupled to a lower surface of the cylindrical batteries 100. The portion of the metal plate 311 coupled to the lower surface may have a flat structure.

FIG. 4 shows the state in which five secondary batteries are coupled to each other. However, the number of secondary batteries that are coupled to each other is not particularly restricted depending on the battery capacity and voltage required by a device that is used.

Hereinafter, the present invention will be described with reference to the following example. This example is provided only for easier understanding of the present invention and should not be construed as limiting the scope of the present invention.

EXAMPLE

An electrode assembly is received in a cylindrical battery case, which is made of a metal material, and on the entire inner surface of which a protective layer, made of a copper material, is formed, a cap assembly is located on the cylindrical battery case, and then a crimping process is performed in order to manufacture a cylindrical secondary battery.

A metal plate is located on a crimping part of the cylindrical secondary battery, and laser welding is performed at a wavelength of 1,064 nm in order to couple the crimping part and the metal plate to each other.

Comparative Example

A cylindrical secondary battery having a metal plate coupled thereto is manufactured using the same method as in Example, except that a cylindrical battery case, made of a metal material, on which no protective layer is formed, is used.

Experimental Example

Damage to the cylindrical secondary batteries each having the metal plate coupled thereto, manufactured according to Example and Comparative Example, was checked, and the results are shown in Table 1 below.

TABLE 1

|  | Welded part of case | Electrode assembly |
|---|---|---|
| Example | Not damaged | Not damaged |
| Comparative Example | Partially melted | Damaged |

Referring to Table 1 above, in the cylindrical secondary battery manufactured according to Comparative Example, heat was generated by a laser beam, and it is not possible to prevent the laser beam from being concentrated on the welded part, i.e. it is not possible to disperse the laser beam, since no separate protective layer is formed in the battery case, whereby a portion of the welded part is melted. Consequently, there is a risk of leakage of an electrolytic solution.

In the cylindrical secondary battery manufactured according to Example, however, the protective layer, made of the copper material, is formed in the battery case, and the protective layer, made of the copper material, is also formed on the inner surface of the crimping part, at which the metal plate is coupled to the battery case. Since the protective layer is capable of reflecting most of a laser beam, it is possible to prevent the laser beam from being introduced into the battery case while maintaining the strength of the weld between the metal plate and the battery case.

Figure 6:
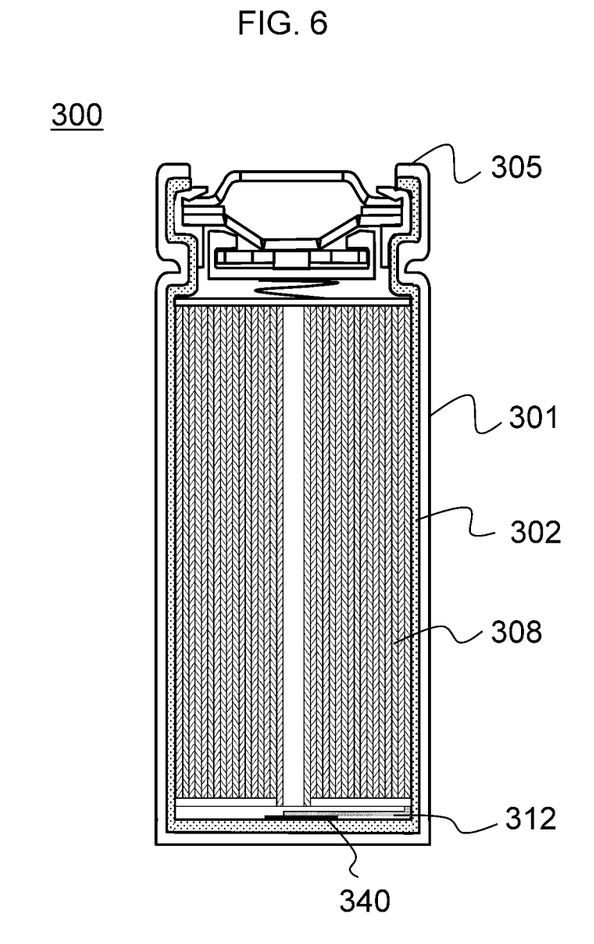
FIG. 6 is a vertical section view showing a cylindrical secondary battery according to another embodiment.

FIG. 6 is a vertical section view showing a cylindrical secondary battery according to another embodiment.

Referring to FIG. 6, a cylindrical secondary battery 300 is configured such that a protective layer 302 is formed in a battery case 301 and the protective layer 302 is also formed on the inner surface of a crimping part 305 of the battery case. The cylindrical secondary battery 300 includes a jelly-roll type electrode assembly 308 configured to have a structure in which a positive electrode sheet and a negative electrode sheet are wound in a state in which a separator is interposed therebetween. The electrode assembly 308 may include a negative electrode tab 312 coupled to the protective layer 302.

Specifically, a nickel-plated layer 340 may be formed on a surface of the protective layer 302 to which the negative electrode tab 312 made of a nickel material is coupled.

Figure 7:
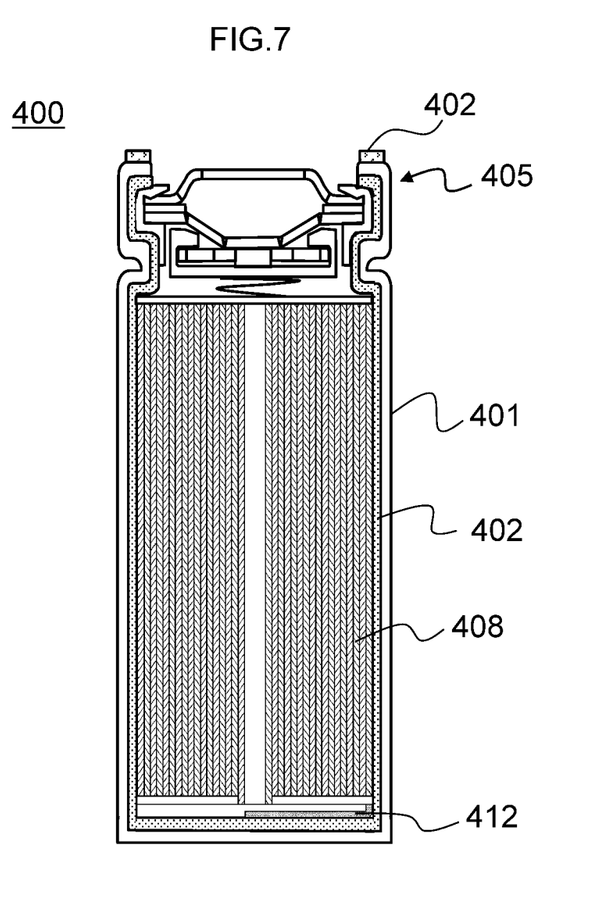
FIG. 7 is a vertical section view showing a cylindrical secondary battery according to another embodiment.

FIG. 7 is a vertical section view showing a cylindrical secondary battery according to another embodiment.

Referring to FIG. 7, a cylindrical secondary battery 400 is configured such that a protective layer 402 is formed in a battery case 401 and the protective layer 402 is also formed on the inner surface of a crimping part 405 of the battery case. The cylindrical secondary battery 400 includes a jelly-roll type electrode assembly 408 configured to have a structure in which a positive electrode sheet and a negative electrode sheet are wound in a state in which a separator is interposed therebetween. The electrode assembly 408 may include a negative electrode tab 412 coupled to the protective layer 402.

In addition, the protective layer 402 may be additionally formed on at least a portion of an outer surface of the cylindrical battery case 401.

In the present invention, as described above, it is possible to prevent welding heat from being concentrated on the welded part. Since it is possible to rapidly disperse thermal energy, it is possible to prevent damage to the battery case and to the electrode assembly and to prevent the leakage of an electrolytic solution.

Those skilled in the art to which the present invention pertains will appreciate that various applications and modifications are possible based on the above description, without departing from the scope of the present invention.

INDUSTRIAL APPLICABILITY

As is apparent from the above description, in a cylindrical secondary battery according to the present invention, a protective layer, made of a material that exhibits high thermal conductivity, is formed on at least a portion of the inner surface of a battery case, including a crimping part. In the case in which laser welding is performed on the crimping part of the battery case for electrical connection of the cylindrical secondary battery, therefore, it is possible to prevent damage to the battery case and an electrode assembly owing to the provision of the protective layer.

The invention claimed is:

1. A cylindrical secondary battery comprising:
    a jelly-roll type electrode assembly;
    a cylindrical battery case configured to receive the jelly roll type electrode assembly and an electrolytic solution, the cylindrical battery case having a crimping part at an open upper end thereof;
    a cap assembly located on the open upper end of the cylindrical battery case; and
    a protective layer, made of a material that exhibits high thermal conductivity, is formed on at least a portion of an inner surface of the cylindrical battery case, including the crimping part.

2. The cylindrical secondary battery according to claim 1, wherein the protective layer is made of copper or a copper alloy.

3. The cylindrical secondary battery according to claim 1, wherein
    a negative electrode tab of the jelly-roll type electrode assembly is coupled to the protective layer formed on the inner surface of the cylindrical battery case, and
    the protective layer is formed on an entirety of the inner surface of the battery case.

4. The cylindrical secondary battery according to claim 3, wherein the negative electrode tab is made of a copper or nickel material.

5. The cylindrical secondary battery according to claim 3, wherein the negative electrode tab is coupled to the protective layer by ultrasonic welding, resistance welding, or laser welding.

6. The cylindrical secondary battery according to claim 1, wherein
the jelly-roll type electrode assembly comprises a negative electrode tab made of a nickel material, and
a nickel-plated layer is formed on a surface of the protective layer to which the negative electrode tab is coupled.

7. The cylindrical secondary battery according to claim 1, wherein the protective layer is configured to have a structure in which irregularities are formed on a surface of the protective layer opposite a surface of the protective layer that faces the inner surface of the cylindrical battery case.

8. The cylindrical secondary battery according to claim 1, wherein the protective layer is additionally formed on at least a portion of an outer surface of the cylindrical battery case.

9. The cylindrical secondary battery according to claim 1, wherein the protective layer has a reflectance of 62% to 90% when a wavelength of a laser is 0.6 μm to 1.1 μm.

10. A battery pack comprising cylindrical secondary batteries according to claim 1, wherein the cylindrical secondary batteries are connected to each other in parallel by a metal plate.

11. The battery pack according to claim 10, wherein the metal plate is coupled to the crimping part of each of the cylindrical secondary batteries or to a lower surface of the cylindrical battery case of each of the cylindrical secondary batteries by laser welding.

12. The battery pack according to claim 10, wherein the metal plate is configured to have a structure in which a protrusion is formed on a part of the metal plate that is coupled to the crimping part of the cylindrical battery case.

13. The battery pack according to claim 10, wherein a part of the metal plate that is coupled to the lower surface of the cylindrical battery case is configured to have a flat structure.

14. The cylindrical secondary battery according to claim 1, further comprising a metal plate coupled to the crimping part of the cylindrical battery case.

15. The cylindrical secondary battery according to claim 14, wherein the metal plate is ring shaped and has a through bore.

16. The cylindrical secondary battery according to claim 14, wherein the metal plate has a protrusion extending from a lower surface of the metal place facing the crimping part.

* * * * *